(12) United States Patent
Makita et al.

(10) Patent No.: US 9,972,903 B2
(45) Date of Patent: May 15, 2018

(54) COMMUNICATION DEVICE

(71) Applicant: TOKIN CORPORATION, Sendai-shi, Miyagi (JP)

(72) Inventors: Kazumasa Makita, Sendai (JP); Masaki Kurimoto, Sendai (JP); Koji Sato, Sendai (JP); Masashi Mori, Sendai (JP)

(73) Assignee: TOKIN CORPORATION, Miyagi (JP)

( * ) Notice: Subject to any disclaimer, the term of this patent is extended or adjusted under 35 U.S.C. 154(b) by 3 days.

(21) Appl. No.: 14/896,915

(22) PCT Filed: Sep. 12, 2014

(86) PCT No.: PCT/JP2014/074285
§ 371 (c)(1),
(2) Date: Dec. 8, 2015

(87) PCT Pub. No.: WO2015/049973
PCT Pub. Date: Apr. 9, 2015

(65) Prior Publication Data
US 2016/0134012 A1    May 12, 2016

(30) Foreign Application Priority Data

Oct. 1, 2013  (JP) ................................ 2013-206135

(51) Int. Cl.
*H01Q 1/50*   (2006.01)
*H01Q 1/00*   (2006.01)
(Continued)

(52) U.S. Cl.
CPC ............. *H01Q 1/50* (2013.01); *H01Q 1/002* (2013.01); *H01Q 9/04* (2013.01); *H04B 1/0458* (2013.01); *H04B 1/18* (2013.01)

(58) Field of Classification Search
CPC ............ H01Q 1/243; H01Q 1/38; H01Q 9/42; H01Q 3/24
(Continued)

(56) References Cited

U.S. PATENT DOCUMENTS

2003/0096583 A1* 5/2003 Watanabe ............ H04B 1/0458
                                                     455/90.1
2010/0060354 A1* 3/2010 Maeda ....................... H03F 1/42
                                                     330/124 R
(Continued)

FOREIGN PATENT DOCUMENTS

| JP | 07221681 A | 8/1995 |
|---|---|---|
| WO | 2007125895 A1 | 11/2007 |
| WO | 2012090904 A1 | 7/2012 |

OTHER PUBLICATIONS

International Search Report (ISR) dated Oct. 14, 2014 issued in International Application No. PCT/JP2014/074285.

*Primary Examiner* — Dameon E Levi
*Assistant Examiner* — Collin Dawkins
(74) *Attorney, Agent, or Firm* — Holtz, Holtz & Volek PC

(57) ABSTRACT

A communication device includes an antenna unit, a switch unit, a matching unit which is connected between the antenna and switch units, a communication unit which is connected to the switch unit, and a switch control unit. When the switch unit is in a conductive state, the matching unit matches a first impedance occurring if the antenna unit is seen from the matching unit and a second impedance occurring if the switch unit is seen from the matching unit. The switch control unit controls the switch unit so that the switch unit is set to the conductive state when the communication unit communicates via the antenna unit, and so that the switch unit is set to an interrupted state when the communication unit is to be protected from overvoltage. The switch control unit and switch unit are semiconductors (Continued)

formed under a first process rule and second process rule, respectively.

6 Claims, 5 Drawing Sheets

(51) Int. Cl.
    *H01Q 9/04*         (2006.01)
    *H04B 1/04*         (2006.01)
    *H04B 1/18*         (2006.01)

(58) Field of Classification Search
    USPC .......................................... 343/860, 876, 745
    See application file for complete search history.

(56) References Cited

U.S. PATENT DOCUMENTS

2013/0270924 A1    10/2013    Mori et al.
2013/0278205 A1*  10/2013    Mullins .................. G06F 21/44
                                                            320/107

* cited by examiner

COMMUNICATION DEVICE

TECHNICAL FIELD

This invention relates to a communication device comprising an antenna section and a communication section connected to the antenna section.

BACKGROUND ART

Recently, non-contact electric power transmission comes to be widely used. A communication device having a non-contact electric power transmission function receives electric power, which is transmitted to an antenna (antenna section) via an electromagnetic wave, with use of electromagnetic induction. The communication device also makes communication with an external device via the antenna. For example, a communication device having a Near field communication (NFC) function makes communication via the electromagnetic wave with use of a RFID provided with a loop antenna. In general, the electric power generated due to the electromagnetic induction in the non-contact electric power transmission is rather larger than the electric power generated due to the electromagnetic induction in the communication such as the NFC. Accordingly, when the communication device carries out the non-contact electric power transmission, a communication section of the communication device might receive excessive electric power larger than its endurable voltage. As a result, the communication section might be damaged.

Patent Document 1 discloses a communication device having the communication function and the non-contact electric power transmission function. The communication device of Patent Document 1 comprises an antenna, a communication section, a switch control section and a switch circuit. The switch circuit is provided between the antenna and the communication section. The switch control section controls ON/OFF of the switch circuit depending on the electric power which the antenna receives. This control protects the communication section against large electric power.

PRIOR ART DOCUMENTS

Patent Document(s)

Patent Document 1: WO2012/090904

SUMMARY OF INVENTION

Technical Problem

Even in a case where a communication device does not have the non-contact electric power transmission function, the communication device is sometimes exposed to the electromagnetic wave used for non-contact electric power transmission. In such a case, the communication section might be damaged. A communication device is therefore preferred to be provided with a protection mechanism for protecting its communication section against high electric power regardless of whether the communication device has the non-contact electric power transmission function or not. However, such protection mechanism makes the size of the communication device larger. Moreover, the impedance between the antenna and the communication section tends to increase because of the protection mechanism. Accordingly, a communication signal might be attenuated while passing between the antenna and the communication section so that the communication quality might be degraded. Nevertheless, a communication device is required to be further miniaturized without degrading its communication quality.

It is therefore an object of the present invention to provide a communication device which includes a protection mechanism for protecting its communication section and which can be miniaturized without degrading its communication quality.

Solution to Problem

First aspect of the present invention provides a communication device comprising an antenna section, a switch section, a matching section, a communication section and a switch control section. The switch section is capable of taking an electrically connected state and an electrically disconnected state. The matching section includes an impedance matching circuit. The matching section is connected between the antenna section and the switch section. The matching section matches a first impedance and a second impedance with each other when the switch section is in the electrically connected state, wherein the first impedance is an impedance seen from the matching section toward the antenna section, and the second impedance is another impedance seen from the matching section toward the switch section. The communication section is connected to the switch section. The switch control section controls the switch section to set the switch section to the electrically connected state when the communication section is required to carry out communication via the antenna section and controls the switch section to set the switch section to the electrically disconnected state when the communication section is required to be protected against overvoltage. The switch control section is a semiconductor circuit formed under a first process rule. The switch section is another semiconductor circuit formed under a second process rule different from the first process rule.

Advantageous Effects of Invention

The switch control section according to the present invention controls the switch section to set the switch section to the electrically disconnected state when the communication section is required to be protected against overvoltage. The communication section is therefore protected against overvoltage. In other words, the switch control section according to the present invention includes a protection mechanism for protecting the communication section. Moreover, the switch control section is a semiconductor circuit formed under a first process rule. The communication device can be miniaturized, for example, by integrating the switch control section and the communication section into a single semiconductor integrated circuit. Moreover, the switch section is another semiconductor circuit formed under a second process rule different from the first process rule. Accordingly, even in the case where the switch control section and the communication section are integrated into the single semiconductor integrated circuit, the switch section can be provided outside of the semiconductor integrated circuit. This configuration can prevent increase of the impedance between the antenna section and the communication section which might be caused because of an excessive miniaturization of the switch section. In other words, the communication quality can be prevented from being degraded.

An appreciation of the objectives of the present invention and a more complete understanding of its structure may be

DESCRIPTION OF EMBODIMENTS

Figure 1:
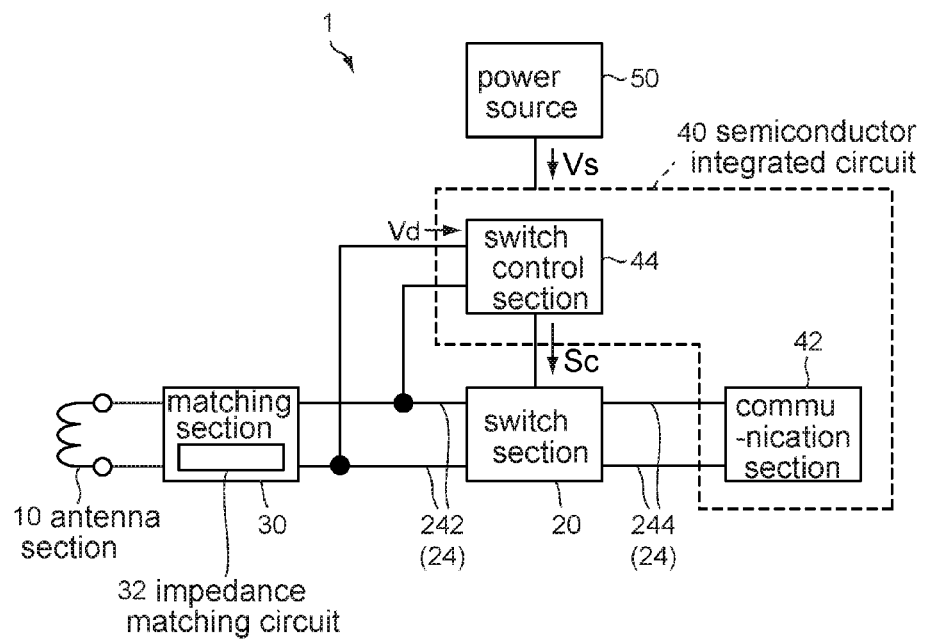
FIG. 1 is a block diagram showing a communication device according to a first embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

First Embodiment

As shown in FIG. 1, a communication device 1 according to a first embodiment of the present invention comprises an antenna section 10, a switch section 20, a matching section 30, a communication section 42, a switch control section 44 and a power source 50. As can be seen from the configuration of FIG. 1, the communication device 1 has a communication function but does not have a non-contact electric power transmission function.

The antenna section 10 is, for example, a loop antenna which can be magnetically coupled with an external antenna (not shown) of an external device (not shown). The antenna section 10 is connected to the communication section 42 via signal lines 24. The communication section 42 is capable of communicating with the external device via the antenna section 10. In detail, the communication section 42 according to the present embodiment is capable of transmitting a signal, or a transmission signal, to the external device via the antenna section 10 and is capable of receiving a signal, or a reception signal, from the external device. In other words, the communication section 42 is either in a communication state, in which the signal is sent or received, or in a standby state, in which the signal is neither sent nor received. Moreover, the communication section 42 in the communication state is either in a signal transmitting state, in which the signal is transmitted, or in a signal receiving state, in which the signal is received.

In the present embodiment, the two signal lines 24 connect the antenna section 10 and the communication section 42 with each other. However, the present invention is not limited thereto. For example, in a case where the communication section 42 carries out communication via load modulation, the communication section 42 may be connected to the antenna section 10 via three or more signal lines.

The switch section 20 is connected between the antenna section 10 and the communication section 42. In other words, the switch section 20 is provided on the signal lines 24. In detail, each of the signal lines 24 is formed of a signal line 242 connected to the matching section 30 and a signal line 244 connected to the communication section 42. The switch section 20 is connected to the matching section 30 via the signal lines 242 and is connected to the communication section 42 via the signal lines 244.

The switch section 20 is capable of taking two states, namely, an electrically connected state and an electrically disconnected state. When the switch section 20 is in the electrically connected state, the communication section 42 can transmit and receive the signal to and from the external device (not shown) via the antenna section 10. When the switch section 20 is in the electrically disconnected state, the communication section 42 and the antenna section 10 are electrically disconnected from each other. The switch section 20, which works as described above, can be formed of semiconductor switches such as MOSFETs.

Figure 2:
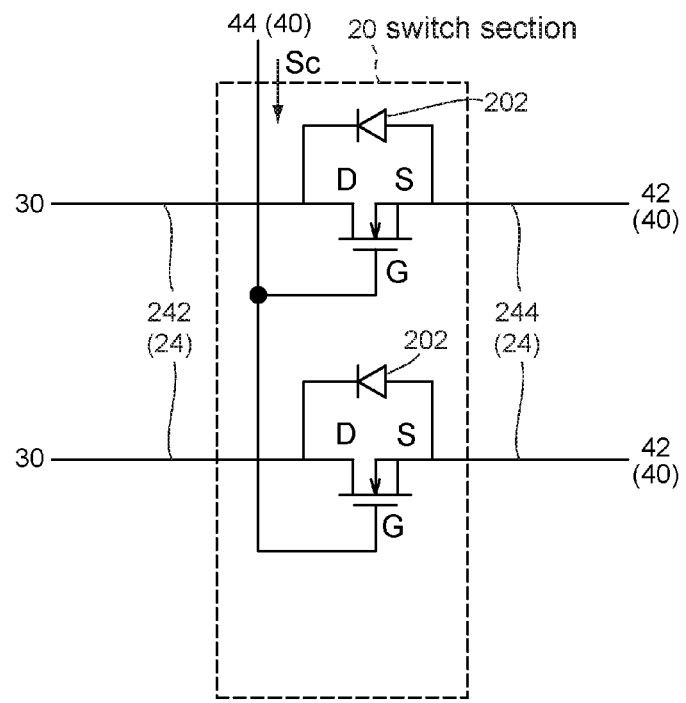
FIG. 2 is a circuit diagram showing an example of a switch section of the communication device of FIG. 1.

For example, the switch section 20 can be formed as shown in FIG. 2. The switch section 20 shown in FIG. 2 is formed of two n-type MOSFETs which correspond to the two signal lines 24, respectively. In each MOSFET, the drain is connected to the corresponding signal line 242, the source is connected to the corresponding signal line 244, and the gate is connected to the switch control section 44. In this configuration, when a control signal Sc, which is a signal having a voltage sufficiently larger than another voltage of the signal line 244, is input to the gate, the drain and the source are electrically connected with each other. In other words, the switch section 20 is set to the electrically connected state. On the other hand, when the aforementioned control signal Sc is not input to the gate, the drain and the source are electrically disconnected from each other. In other words, the switch section 20 is set to the electrically disconnected state.

As shown in FIG. 1, the matching section 30 is connected between the antenna section 10 and the switch section 20. In detail, the matching section 30 is connected to opposite ends of the antenna section 10. In addition, the matching section 30 is connected to the switch section 20 via the signal lines 242. The matching section 30 includes, at least in part, an impedance matching circuit 32.

The matching section 30, or the impedance matching circuit 32, matches a first impedance and a second impedance with each other when the switch section 20 is in the electrically connected state, wherein the first impedance is an impedance seen from the matching section 30 toward the antenna section 10, and the second impedance is another impedance seen from the matching section 30 toward the switch section 20.

In particular, in the present embodiment, the matching section 30 performs impedance conversion and matches the first impedance and the second impedance with each other so as to make the second impedance lower than the first impedance. In other words, according to the present embodiment, the second impedance is lower than the first impedance. As a result, amplitude of a voltage applied to the communication section 42 is made smaller than amplitude of another voltage in the antenna section 10. This mechanism, to some extent, can prevent overvoltage from being applied to the communication section 42, wherein the overvoltage is a voltage which is higher than another voltage necessary for the communication of the communication section 42 and is so high that the communication section 42 might be damaged.

For example, under a condition where the antenna section 10 is exposed to an electromagnetic wave used for non-contact electric power transmission, the antenna section 10 might generate the overvoltage. The matching section 30 according to the present embodiment lowers the voltage generated in the antenna section 10 to prevent the overvoltage from being applied to the communication section 42. However, the matching section 30 by itself cannot completely prevent the overvoltage. Another protection mechanism described later is necessary regardless of whether the matching section 30 has the function to prevent the overvoltage or not. The matching section 30 is therefore not required to have the function to prevent the overvoltage in some case. In such a case, each of the first impedance and the second impedance may have various values. For example, the matching section 30 may match the first impedance and the second impedance with each other, similar to a general matching section, so that the first impedance is equal to the second impedance.

Since the matching section 30 according to the present embodiment works as described above, a voltage on the signal line 24 is lower and more stable than another voltage generated between the antenna section 10 and the matching section 30. Since the switch section 20 is provided on the signal lines 24, the switch section 20 can stably work even in the case where the switch section 20 is formed of the MOSFETs (see FIG. 2) as previously described. Moreover, the switch section 20 can more stably work because the source of The MOSFET is connected to the signal line 244 on which the voltage becomes more stable relative to that on the signal line 242.

As shown in FIG. 1, the switch control section 44 is connected to the signal lines 242. In other words, the switch control section 44 is connected to the antenna section 10 in parallel to the switch section 20. In addition, the switch control section 44 is connected to the switch section 20. As can be seen from this structure, the switch control section 44 controls the switch section 20 depending on the voltage on the signal line 242.

More specifically, the switch control section 44 sets the switch section 20 to the electrically connected state when the communication section 42 is required to carry out communication via the antenna section 10. On the other hand, the switch control section 44 sets the switch section 20 to the electrically disconnected state when the communication section 42 is required to be protected against the overvoltage.

In detail, the switch control section 44 according to the present embodiment includes a rectifier circuit (not shown). The switch control section 44 is capable of detecting the voltage on the signal line 242 as a detected voltage Vd which is a DC voltage via the rectifier circuit. Referring to FIGS. 1 and 2, when the detected voltage Vd is equal to or lower than a predetermined threshold, the switch control section 44 outputs the control signal Sc to the switch section 20 to keep the switch section 20 in the electrically connected state. On the other hand, when the detected voltage Vd exceeds the predetermined threshold, the switch control section 44 stops the control signal Sc to transfer the switch section 20 into the electrically disconnected state As can be seen from the above explanation, the switch control section 44 stops the control signal Sc when detecting in advance that the overvoltage is to be applied to the communication section 42. When the switch control section 44 stops the control signal Sc, the communication section 42 is electrically disconnected from the antenna section 10 and is therefore protected against the overvoltage. In other words, the communication device 1 according to the present embodiment includes this protection mechanism for protecting the communication section 42. The protection mechanism according to the present embodiment is mainly formed of the switch control section 44 and the switch section 20.

In particular, the switch control section 44 according to the present embodiment detects the overvoltage in advance based on the detected voltage Vd. In detail, the switch control section 44 detects in advance that a voltage equal to or larger than the overvoltage is to be applied to the communication section 42 when the detected voltage Vd exceeds the predetermined threshold. This predetermined value may be smaller than the overvoltage and equal to or larger than a voltage necessary for the communication of the communication section 42. The applying of the overvoltage to the communication section 42 may be detected in advance with use of some method other than that of the present embodiment. For example, the applying of the overvoltage to the communication section 42 may be detected with use of a frequency component of an electric power transmission wave received by the antenna section 10 or with use of an electric power transmission notification signal which is transmitted from an external electric power transmission device (not shown) prior to the electric power transmission.

Referring to FIG. 1, the communication device 1 includes a semiconductor integrated circuit 40 formed under a first process rule. The semiconductor integrated circuit 40 receives an operating power of a source voltage Vs which the power source 50 supplies. The semiconductor integrated circuit 40 integrates and includes a large number of primary semiconductor circuits of the communication device 1. According to the present embodiment, the communication section 42 and the switch control section 44 are included in the semiconductor integrated circuit 40. In other words, each of the communication section 42 and the switch control section 44 is a semiconductor circuit formed under the first process rule. The semiconductor integrated circuit 40 can be miniaturized by making the width of the circuit line under the first process rule extremely small. In other words, the communication device 1 can be miniaturized by integrating the communication section 42 and the switch control section 44 into the single semiconductor integrated circuit 40.

In the present embodiment, the matching section 30 is not included in the semiconductor integrated circuit 40. However, the matching section 30 may be included in the semiconductor integrated circuit 40. In the case where the semiconductor integrated circuit 40 includes the matching section 30, the semiconductor integrated circuit 40 can integrate all of the semiconductor circuits to each of which the power source 50 needs to supply the operating power. As a result, the communication device 1 can be further miniaturized.

Referring to FIG. 1, the switch section 20 according to the present embodiment is a discrete component and is therefore not included in the semiconductor integrated circuit 40. In other words, the switch section 20 is another semiconductor circuit formed under a second process rule different from the first process rule. According to the present embodiment, the communication section 42 and the switch control section 44 are included in the single semiconductor integrated circuit 40, while the switch section 20 is provided outside of the semiconductor integrated circuit 40. As described below, this structure makes it possible to prevent the impedance between the antenna section 10 and the communication section 42 from increasing, otherwise the impedance might increase because of an excessive miniaturization of the switch section 20.

Referring to FIGS. 1 and 2, the impedance of the switch section 20 is not zero even when the switch section 20 is in the electrically connected state. In addition, the signal line 24 has its impedance. The impedance between the matching section 30 and the communication section 42 is therefore not zero even when the switch section 20 is in the electrically connected state. When the communication section 42 transmits the signal via the antenna section 10, the electric current of the transmission signal from the communication section 42 is attenuated by the impedance between the matching section 30 and the communication section 42. In other words, the transmission signal from the communication section 42 is attenuated.

As previously described, according to the present embodiment, the second impedance, or the impedance seen from the matching section 30 toward the switch section 20 under the electrically connected state of the switch section 20, is lower than the first impedance, or the impedance seen from the matching section 30 toward the antenna section 10 under the electrically connected state of the switch section 20. Accordingly, the amplitude of the electric current in the antenna section 10 becomes small relative to the amplitude of the electric current on the signal line 24. In other words, according to the present embodiment, the transmission signal from the communication section 42 tends to be relatively easily attenuated.

Moreover, if the switch section 20 is integrated into the semiconductor integrated circuit 40, the impedance between the antenna section 10 and the communication section 42 increases because of the miniaturization of the switch section 20. For example, the most part of the signal lines 24 is integrated into the semiconductor integrated circuit 40, and therefore, a cross-section of the signal line 24 becomes extremely small. As a result, the impedance of the signal line 24 increases. In contrast, since the switch section 20 according to the present embodiment is provided outside of the semiconductor integrated circuit 40, the aforementioned increase of the impedance can be prevented. According to the present embodiment, the attenuation of the transmission signal from the communication section 42 can be suppressed, and therefore, the communication quality can be prevented from being degraded while the communication device 1 is wholly miniaturized.

In a view point of suppressing the attenuation of the transmission signal, when the switch section 20 is in the electrically connected state, the impedance between the matching section 30 and the communication section 42 (i.e. the impedance under the electrically connected state) is preferred to be as small as possible. More specifically, the impedance under the electrically connected state is preferred to be equal to or less than 10Ω (excluding 0), further preferred to be equal to or less than 5Ω (excluding 0) and still further preferred to be equal to or less than 2Ω (excluding 0).

As can be seen from FIGS. 1 and 2, when the switch section 20 is in the electrically disconnected state, the matching section 30 and the communication section 42, which are connected with each other via the switch section 20, have an electrostatic capacity therebetween. When the overvoltage is generated in the antenna section 10, for example, when the antenna section 10 is exposed to the electromagnetic wave used for non-contact electric power transmission, the overvoltage might be propagated to the communication section 42 because of this capacitor structure. In a view point of preventing this propagation, when the switch section 20 is in the electrically disconnected state, the impedance between the matching section 30 and the communication section 42, or the electrostatic capacity component of reactance component under this state, is preferred to be as large as possible. More specifically, the impedance under the electrically disconnected state is preferred to be equal to or more than 400Ω, further preferred to be equal to or more than 1 kΩ and still further preferred to be equal to or more than 3 kΩ.

Figure 3:
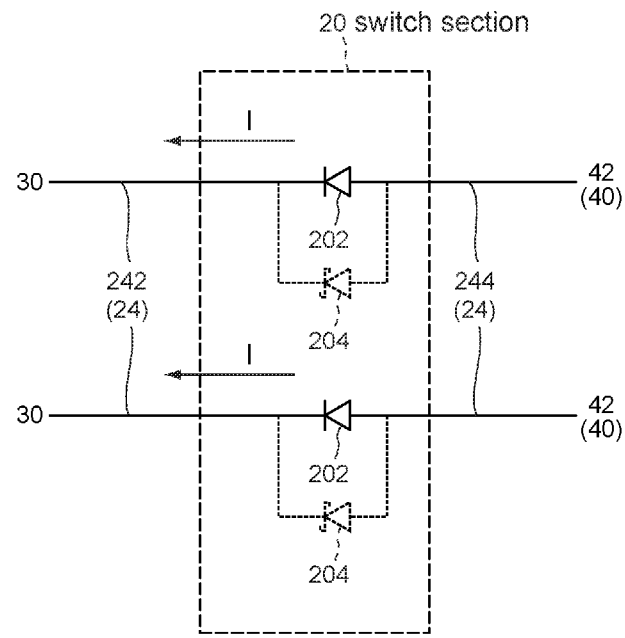
FIG. 3 is a circuit diagram showing an equivalent circuit of FIG. 2 under a condition where the switch section is in an electrically disconnected state.

The present embodiment can be variously modified. For example, as shown in FIGS. 2 and 3, the MOSFET generally includes a parasitic diode 202 formed between the drain and the source because of the process rule of the semiconductor, or because of the second process rule in the present embodiment. Referring to FIGS. 2 and 3, even when the switch section 20 is in the electrically disconnected state, the antenna section 10 generates a voltage depending on intensity of an electromagnetic wave therearound so that the voltage in the matching section 30 fluctuates. When the voltage toward the matching section 30, or the voltage on the signal line 242, decreases lower than the voltage toward the communication section 42, or the voltage on the signal line 244, an electric current I flows toward the matching section 30 via the parasitic diode 202. The parasitic diode 202 therefore needs to have an ampacity sufficient for the electric current I. In addition, if there is a possibility that the electric current I might become so large as to damage the parasitic diode 202 (i.e. the MOSFET), the damage of the MOSFET may be prevented as explained below.

Referring to FIG. 3, for example, a schottky-barrier diode 204 having a forward voltage lower than that of the parasitic diode 202 may be connected between the drain and the source. This structure allows the most part of the electric current I to flow in the schottky-barrier diode 204 so as to avoid concentration of the electric current to the parasitic diode 202.

Second Embodiment

Figure 4:
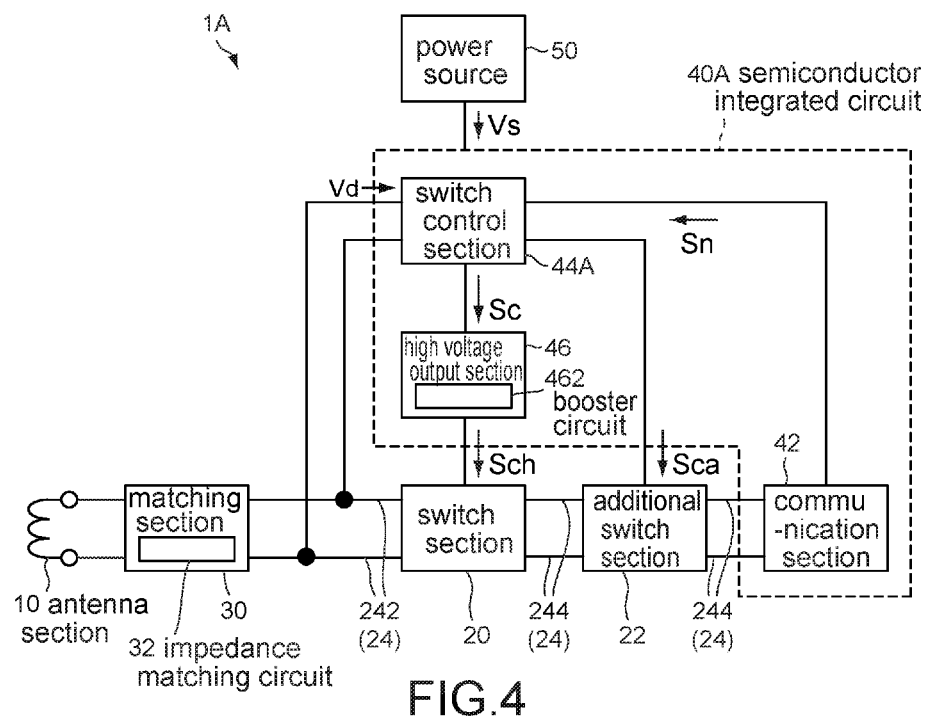
FIG. 4 is a block diagram showing a communication device according to a second embodiment of the present invention.

As can be seen from FIG. 4, a communication device 1A according to a second embodiment of the present invention comprises an additional switch section 22 and a high voltage output section 46 in addition to the components of the communication device 1 (see FIG. 1). Moreover, the communication device 1A comprises a switch control section 44A slightly different from the switch control section 44 of the communication device 1. The communication device 1A is formed similar to the communication device 1 and works similar to the communication device 1 except the aforementioned difference. Hereafter, explanation is mainly made about the difference between the communication device 1A and the communication device 1.

As shown in FIG. 4, the switch control section 44A is connected to the communication section 42. The communication section 42 sends a notification signal Sn to the switch control section 44A when the communication section 42 is in the signal transmitting state. In detail, when the signal transmission to the external device (not shown) is started, the notification signal Sn is sent to the switch control section 44A. The communication section 42 stops the notification signal Sn when the signal transmission to the external device is finished. The switch control section 44A can therefore judge, depending on the presence/absence of the notification signal Sn, whether the communication section 42 is in the signal transmitting state or not. As described later, the switch control section 44A controls the switch section 20 and the additional switch section 22 differently depending on the presence/absence of the notification signal Sn. For example, the switch control section 44A outputs the control signal Sc under a condition different from that of the switch control section 44 (see FIG. 1).

The high voltage output section 46 is connected between the switch control section 44A and the switch section 20. In other words, the switch control section 44A is connected to the switch section 20 via the high voltage output section 46. The high voltage output section 46 includes, at least in part, a booster circuit 462. The switch control section 44A generates the control signal Sc similar to the switch control section 44 (see FIG. 1) but under a condition different from that of the switch control section 44 and supplies the control signal Sc to the high voltage output section 46. The booster circuit 462 boosts the voltage of the supplied control signal Sc to generate a high voltage control signal Sch. The high voltage output section 46 outputs the generated high voltage control signal Sch to the switch section 20. In other words, in response to the control signal Sc, the high voltage output section 46 generates the high voltage control signal Sch for controlling the switch section 20 to supply the high voltage control signal Sch to the switch section 20.

Figure 5:
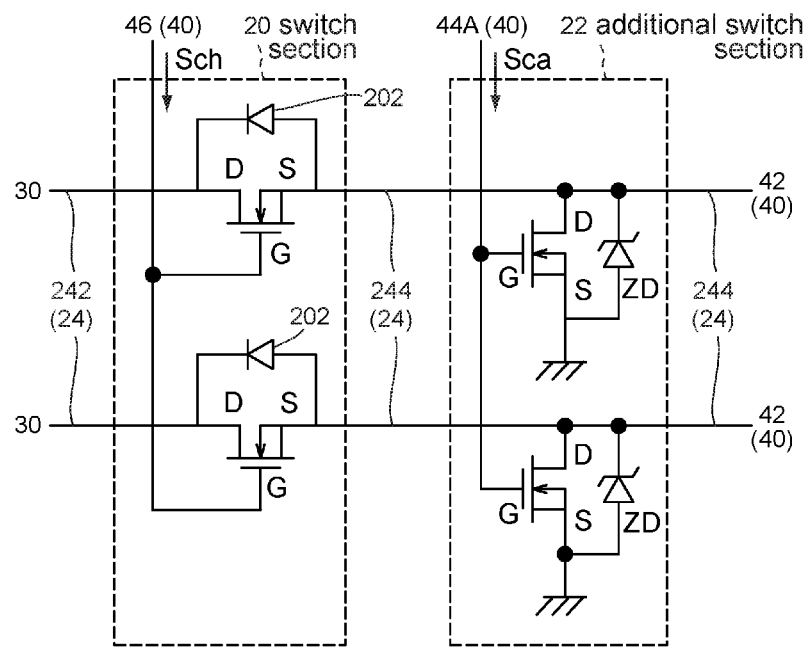
FIG. 5 is a circuit diagram showing an example of a switch section and an example of an additional switch section of the communication device of FIG. 4.

Referring to FIG. 5, the switch section 20 according to the present embodiment has its structure same as that of the switch section 20 according to the first embodiment (see FIG. 2). However, the gate of the MOSFET of the switch section 20 is not directly connected to the switch control section 44A (see FIG. 4) but connected to the high voltage output section 46. In other words, the gate of the MOSFET is indirectly connected to the switch control section 44A via the high voltage output section 46.

Referring to FIGS. 4 and 5, under a condition where the switch section 20 is in the electrically connected state and where the communication section 42 is not in the signal transmitting state (for example, where the communication section 42 is in the signal receiving state), the voltage on the signal line 244 is relatively low. The control signal Sc therefore can make the voltage of the gate of the MOSFET sufficiently large relative to the voltage of the source even if the voltage of the control signal Sc is relatively low. Accordingly, the switch section 20 can be properly transferred from the electrically connected state to the electrically disconnected state to protect the communication section 42 against the overvoltage.

In general, the voltage of the transmission signal is higher than the voltage of the reception signal. Accordingly, under a condition where the switch section 20 is in the electrically connected state and where the communication section 42 is in the signal transmitting state, the voltage of the source of the MOSFET is raised because of the voltage of the transmission signal. However, the voltage of the control signal Sc is equal to or lower than the source voltage Vs supplied from the power source 50. When the voltage of the source of the MOSFET gets near to the source voltage Vs supplied from the power source 50, the voltage of the gate of the MOSFET is not made sufficiently large relative to the voltage of the source. In such a case, the control signal Sc cannot keep the electrically connected state of the switch section 20.

According to the present embodiment, the high voltage control signal Sch is output to the gate of the MOSFET instead of the control signal Sc. The high voltage control signal Sch is sufficiently largely boosted so that the voltage of the gate can be made sufficiently large relative to the voltage of the source even when the voltage of the source is raised because of the voltage of the transmission signal. In other words, the high voltage control signal Sch can keep the electrically connected state of the switch section 20 even under the condition where the switch section 20 is in the electrically connected state and where the communication section 42 is in the signal transmitting state.

As shown in FIGS. 4 and 5, the additional switch section 22 is connected between the switch section 20 and the communication section 42. In addition, the additional switch section 22 is connected to the switch control section 44A without the high voltage output section 46. The additional switch section 22 is controlled by an additional control signal Sca which the switch control section 44A outputs.

In detail, as shown in FIG. 5, the additional switch section 22 according to the present embodiment is formed of two semiconductor switches, each of which is an n-type MOSFET, and two zener diodes (ZD). In each MOSFET, the drain is connected to the signal line 244, and the source is grounded. In each MOSFET, the gate is connected to the switch control section 44A.

The switch control section 44A outputs the additional control signal Sca when detecting in advance that the overvoltage is to be applied to the communication section 42. The source of the additional switch section 22 is connected to the ground to be kept at a constant voltage. The additional control signal Sca having the voltage based on the ground voltage therefore can transfer the additional switch section 22 to an electrically connected state. Accordingly, the additional control signal Sca does not need to be boosted by the high voltage output section 46. When the additional switch section 22 is in the electrically connected state, the signal lines 244 are connected to the ground, and the communication section 42 is therefore electrically disconnected from the switch section 20. In contrast, when the additional control signal Sca is not applied to the gates, the additional switch section 22 is in an electrically disconnected state. At that time, the signal lines 244 are not grounded, and the communication section 42 is therefore electrically connected with the switch section 20.

As can be seen from the above explanation, according to the present embodiment, the switch section 20 can electrically disconnect the signal lines 244, and the additional switch section 22 can ground the signal lines 244. In other words, the protection mechanism according to the present embodiment includes the additional switch section 22 in addition to the switch control section 44A and the switch section 20. This mechanism can more securely protect the communication section 42 against the overvoltage. In addition, according to the present embodiment, the additional switch section 22 has a protection function by means of zener diodes (ZD). In detail, the zener diode (ZD) is connected in parallel between the drain and the source of the MOSFET of the additional switch section 22. This structure can protect the communication section 42 against the overvoltage even if the transition of the additional switch section 22 into the electrically connected state is late so that the voltage on the signal line 244 is temporarily raised.

Referring to FIG. 4, similar to the communication device 1 (see FIG. 1), the communication device 1A includes a semiconductor integrated circuit 40A formed under the first process rule. The semiconductor integrated circuit 40A receives an operating power of the source voltage Vs supplied from the power source 50. According to the present embodiment, the high voltage output section 46 is also included in the semiconductor integrated circuit 40A in addition to the communication section 42 and the switch control section 44A. Moreover, the matching section 30 may be included in the semiconductor integrated circuit 40A. According to the present embodiment, the communication device 1A can be miniaturized similar to the first embodiment.

Referring to FIG. 4, similar to the first embodiment, the switch section 20 is the discrete component and is therefore not included in the semiconductor integrated circuit 40A. Accordingly, similar to the first embodiment, the communication quality can be prevented from being degraded while the communication device 1A is wholly miniaturized.

As explained below, the communication device 1A according to the present embodiment has an energy-saving function. In general, the booster circuit 462, when working, consumes more electric power relative to the other component such as the switch control section 44A. This booster circuit 462 is necessary only for the purpose of transferring the switch section 20 into the electrically connected state to enable the communication of the communication section 42. The switch control section 44A according to the present embodiment therefore outputs the control signal Sc to the high voltage output section 46 to activate the booster circuit 462 only when the communication section 42 is required to be communicatable. Thus, the booster circuit 462 stops its action when the communication section 42 is not in the signal transmitting state.

In detail, the switch control section 44A controls the switch section 20 with use of two thresholds, namely, a first threshold and a second threshold. The first threshold is the minimum value of the detected voltage Vd which is generated because of the reception of the communication signal by the antenna section 10. The second threshold, similar to the predetermined threshold in the first embodiment, is equal to or larger than the voltage necessary for the communication by the communication section 42 and is smaller than the overvoltage. Moreover, the second threshold is larger than the first threshold.

When the detected voltage Vd is smaller than the first threshold, the switch control section 44A controls the switch section 20 based on the presence/absence of the notification signal Sn sent from the communication section 42. In detail, when the notification signal Sn is received, the switch control section 44A outputs the control signal Sc to keep the switch section 20 in the electrically connected state and therefore enables the communication of the communication section 42. On the other hand, when the notification signal Sn is not received, the switch control section 44A stops the control signal Sc to set the switch section 20 to the electrically disconnected state. Nevertheless, the switch control section 44A judges that the antenna section 10 receives the signal for communication when the detected voltage Vd is not less than the first threshold and is not more than the second threshold. At that time, the switch control section 44A outputs the control signal Sc to keep the switch section 20 in the electrically connected state. The switch control section 44A stops the control signal Sc to set the switch section 20 to the electrically disconnected state if the detected voltage Vd exceeds the second threshold.

The switch control section 44A controls the additional switch section 22 with use of only the second threshold. In detail, when the detected voltage Vd exceeds the second threshold, the switch control section 44A outputs the additional control signal Sca to keep the additional switch section 22 in the electrically connected state. On the other hand, when the detected voltage Vd is equal to or less than the second threshold, the switch control section 44A stops the additional control signal Sca to set the additional switch section 22 to the electrically disconnected state.

As can be seen from the above explanation, when the detected voltage Vd exceeds the second threshold, the switch section 20 is set to the electrically disconnected state, and the additional switch section 22 grounds the signal lines 244. As a result, the communication section 42 is more securely protected against the overvoltage. Moreover, since the switch control section 44A performs control based on the notification signal Sn from the communication section 42, improper disconnection of the signal lines 244 under the signal transmitting state of the communication section 42 can be prevented, and in the meantime electric power consumption due to the action of the booster circuit 462 can be suppressed.

Figure 7:
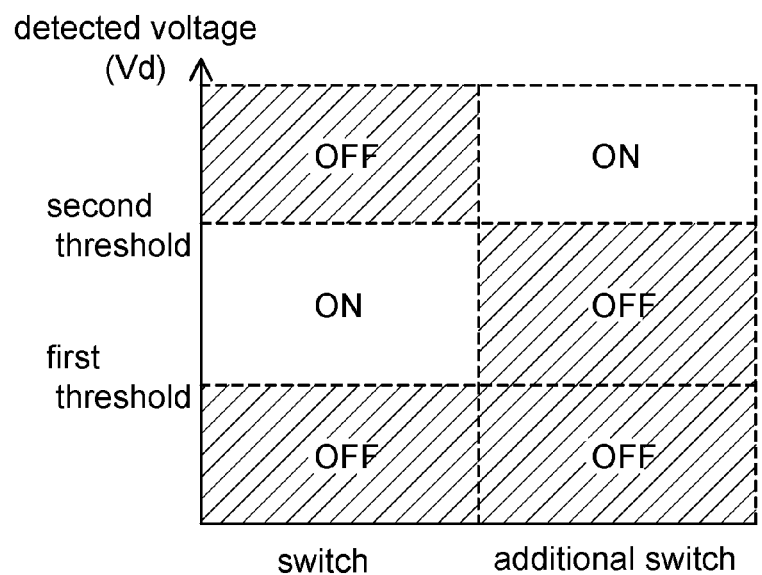
FIG. 7 is a view showing an action of the switch section and an action of the additional switch of FIG. 3 under a condition where a communication section of the communication device of FIG. 4 is not in a signal transmitting state.
Figure 8:
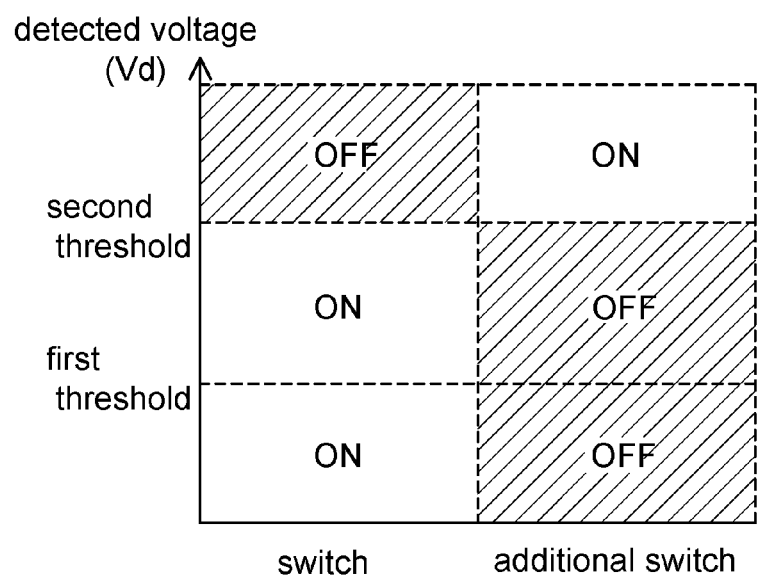
FIG. 8 is a view showing an action of the switch section and an action of the additional switch of FIG. 3 under a condition where the communication section of the communication device of FIG. 4 is in the signal transmitting state.

FIGS. 7 and 8 shows the action of each of the switch section 20 and the additional switch section 22 due to the aforementioned control of the switch control section 44A. In FIGS. 7 and 8, "ON" indicates that each of the switch section 20 and the additional switch section 22 is in its electrically connected state, and "OFF" indicates that each of the switch section 20 and the additional switch section 22 is in its electrically disconnected state.

When the communication section 42 is not in the signal transmitting state, each of the switch section 20 and the additional switch section 22 changes its state as shown in FIG. 7. In detail, when the detected voltage Vd is smaller than the first threshold, the antenna section 10 does not receive the reception signal, and the communication section 42 is not required to be protected against the overvoltage. Accordingly, each of the switch section 20 and the additional switch section 22 is set to OFF. When the detected voltage Vd is not less than the first threshold and not more than the second threshold, the signal reception of the communication section 42 is required to be allowed. Accordingly, the switch section 20 is set to ON while the additional switch section 22 is set to OFF. When the detected voltage Vd exceeds the second threshold, the communication section 42 is required to be protected against the overvoltage. Accordingly, the switch section 20 is set to OFF while the additional switch section 22 is set to ON.

When the communication section 42 is in the signal transmitting state, each of the switch section 20 and the additional switch section 22 changes its state as shown in FIG. 8. In detail, when the detected voltage Vd is smaller than the first threshold, the antenna section 10 does not receive the reception signal, but the signal transmission from the communication section 42 is required to be enabled. Accordingly, the switch section 20 is set to ON while the additional switch section 22 is set to OFF. When the detected voltage Vd is not less than the first threshold and not more than the second threshold, the communication section 42 transmits or receives the signal via the antenna section 10. Accordingly, the switch section 20 is set to ON while the additional switch section 22 is set to OFF. When the detected voltage Vd exceeds the second threshold, the communication section 42 is required to be protected against the overvoltage. Accordingly, the switch section 20 is set to OFF while the additional switch section 22 is set to ON.

Figure 6:
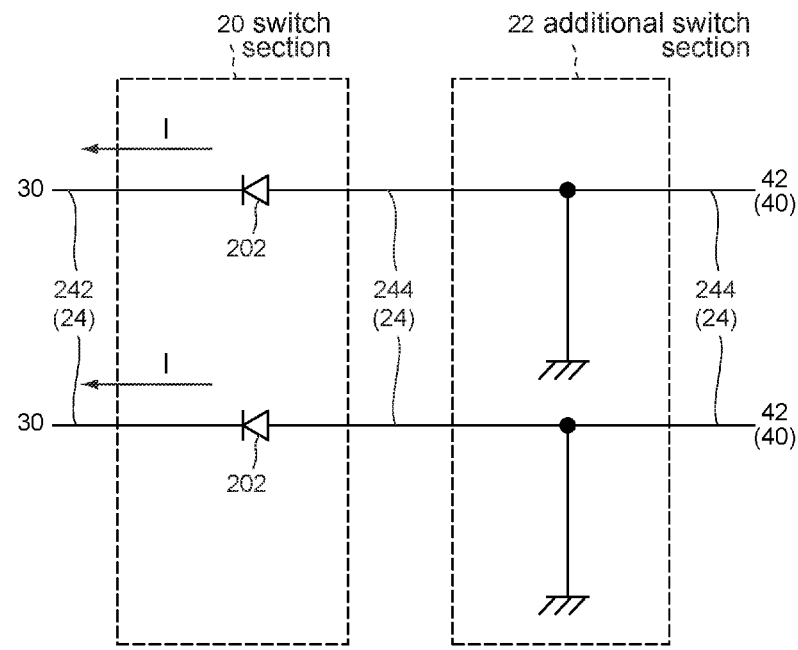
FIG. 6 is a circuit diagram showing an equivalent circuit of FIG. 5 under a condition where the switch section is in the electrically disconnected state and where the additional switch section is in an electrically connected state.

The present embodiment can be variously modified. For example, as shown in FIGS. 5 and 6, the parasitic diode 202 is formed also in the present embodiment similar to the first embodiment (see FIGS. 2 and 3). Referring to FIGS. 5 and 6, under a condition where the switch section 20 is in the electrically disconnected state and the additional switch section 22 is in the electrically connected state, when the voltage on the signal line 242 becomes lower than the ground voltage, the electric current I flows toward the matching section 30 via the parasitic diode 202. The damage of the MOSFET therefore may be prevented similar to the first embodiment if there is a possibility that the electric current I might become so large as to damage the parasitic diode 202 (i.e. the MOSFET).

Third Embodiment

Figure 9:
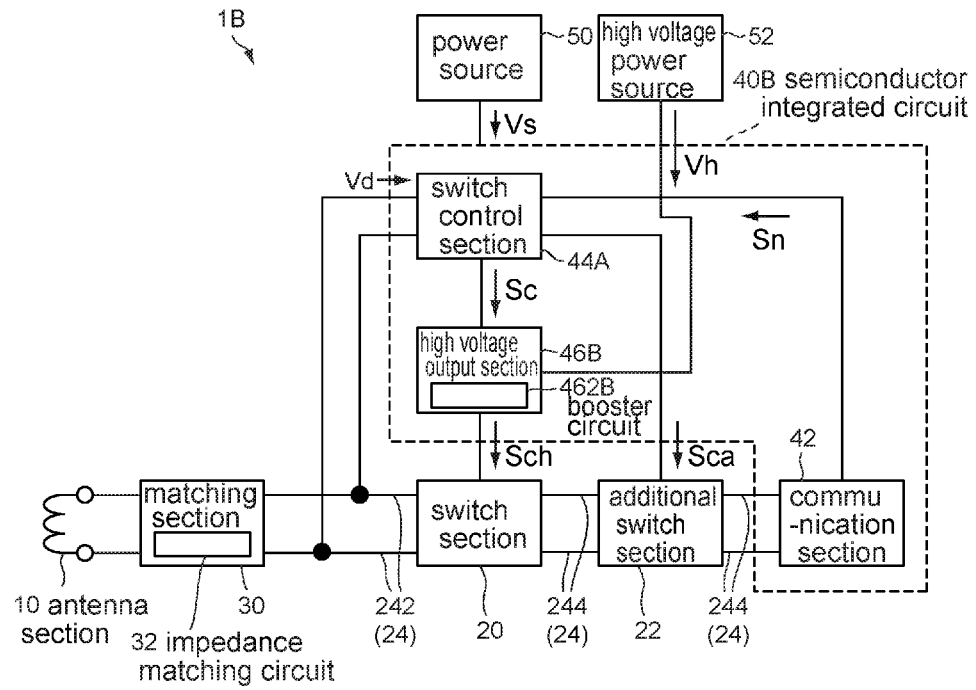
FIG. 9 is a block diagram showing a communication device according to a third embodiment of the present invention.

As shown in FIG. 9, a communication device 1B according to a third embodiment of the present invention comprises a high voltage power source 52 in addition to the components of the communication device 1A (see FIG. 4). Moreover, the communication device 1B comprises a high voltage output section 46B slightly different from the high voltage output section 46 of the communication device 1A. The communication device 1B is formed similar to the communication device 1A and works similar to the communication device 1A except the aforementioned difference. Hereafter, explanation is mainly made about the difference between the communication device 1B and the communication device 1A.

The high voltage output section 46B according to the present embodiment is connected between the switch control section 44A and the switch section 20 similar to the high voltage output section 46 (see FIG. 4). The high voltage output section 46B includes, at least in part, a booster circuit 462B. Similar to the booster circuit 462, the booster circuit 462B boosts the voltage of the control signal Sc supplied from the switch control section 44A to generate the high voltage control signal Sch. The high voltage output section 46B outputs the generated high voltage control signal Sch to the switch section 20. In other words, similar to the high voltage output section 46, the high voltage output section 46B, in response to the control signal Sc, generates the high voltage control signal Sch for controlling the switch section 20 to supply the high voltage control signal Sch to the switch section 20.

As can be seen from the above explanation, the high voltage output section 46B according to the present embodiment has a function basically same as that of the high voltage output section 46 according to the second embodiment (see FIG. 4). However, the high voltage output section 46B according to the present embodiment is connected to the high voltage power source 52. The high voltage power source 52 supplies an operating power, which has the source voltage Vh higher than the source voltage Vs of the power source 50, to the high voltage output section 46B. The high voltage output section 46B converts the voltage of the control signal Sc into a high voltage with use of the high source voltage Vh supplied from the high voltage power source 52 and outputs the high voltage. In other words, the high voltage control signal Sch has this high voltage after the conversion.

Figure 10:
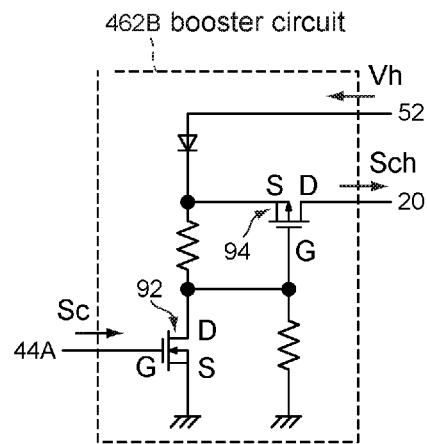
FIG. 10 is a circuit diagram showing an example of a booster circuit of the communication device of FIG. 9.

For example, the booster circuit 462B can be formed as shown in FIG. 10. The booster circuit 462B shown in FIG. 10 is mainly formed of an n-type MOSFET 92 and a p-type MOSFET 94. The control signal Sc output from the switch control section 44A is applied to the gate of the MOSFET 92. The drain and the source of the MOSFET 92 are therefore electrically connected with each other so that the gate voltage of the MOSFET 94 is lowered. As a result, the drain and the source of the MOSFET 94 are also electrically connected with each other. The high source voltage Vh of the high voltage power source 52 is slightly lowered by a diode but is supplied to the switch section 20 as the high voltage control signal Sch.

Referring to FIG. 9, according to the present embodiment, the switch section 20 and the additional switch section 22 can be controlled similar to the second embodiment. For example, when the communication section 42 is in the signal transmitting state, the communication section 42 can be kept in a state of being connected with the antenna section 10. In particular, according to the present embodiment, the voltage of the high voltage control signal Sch depends on the source voltage Vh of the high voltage power source 52. This mechanism more securely prevents the transition of switch section 20 into the electrically disconnected state, which might be caused because of the increase of the voltage on the signal line 244 when the communication section 42 transmits the signal.

Similar to the communication device 1 (see FIG. 1), the communication device 1B includes a semiconductor integrated circuit 40B formed under the first process rule. The semiconductor integrated circuit 40B receives an operating power applied from the power source 50. According to the present embodiment, the communication section 42, the switch control section 44A and the high voltage output section 46B are included in the semiconductor integrated circuit 40B. Moreover, the matching section 30 may be included in the semiconductor integrated circuit 40B. According to the present embodiment, the communication device 1B can be miniaturized similar to the first embodiment.

Referring to FIG. 9, similar to the first embodiment, the switch section 20 is a discrete component and is therefore not included in the semiconductor integrated circuit 40B. Accordingly, similar to the first embodiment, the communication quality can be prevented from being degraded while the communication device 1B is wholly miniaturized.

The present invention is not limited to the already explained embodiments and modifications but can be variously modified and applied. For example, the action of the switch control section under a condition where the detected voltage Vd is equal to one of the boundary values, namely, the predetermined threshold, the first threshold and the second threshold, may be same as that under a condition where the detected voltage Vd is less than the boundary value or may be same as that under a condition where the detected voltage Vd is more than the boundary value. Moreover, the present invention is applicable to a communication device which has the non-contact electric power transmission function in addition to the communication function.

The present application is based on a Japanese patent application of JP2013-206135 filed before the Japan Patent Office on Oct. 1, 2013, the content of which is incorporated herein by reference.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

REFERENCE SIGNS LIST 1, 1A, 1B communication device
10 antenna section
20 switch section
202 parasitic diode
204 schottky-barrier diode
22 additional switch section
24, 242, 244 signal line
30 matching section
32 impedance matching circuit
40, 40A, 40B semiconductor integrated circuit
42 communication section
44, 44A switch control section
46, 46B high voltage output section
462, 462B booster circuit
50 power source
52 high voltage power source
92 MOSFET
94 MOSFET
Sc control signal
Sch high voltage control signal
Sca additional control signal
Sn notification signal
Vd detected voltage
Vs source voltage
Vh source voltage

The invention claimed is:

1. A communication device comprising:
an antenna section;
a switch section capable of taking an electrically connected state and an electrically disconnected state;
a matching section including an impedance matching circuit and connected between the antenna section and the switch section, the matching section matching a first impedance and a second impedance with each other when the switch section is in the electrically connected state, the first impedance being an impedance seen from the matching section toward the antenna section, and the second impedance being another impedance seen from the matching section toward the switch section;
a communication section connected to the switch section; and
a switch control section which controls the switch section to set the switch section to the electrically connected state when the communication section is required to carry out communication via the antenna section and which controls the switch section to set the switch section to the electrically disconnected state when the communication section is required to be protected against overvoltage,
wherein the switch control section is included in a semiconductor integrated circuit, and the switch section is another semiconductor circuit which is provided outside the semiconductor integrated circuit,
wherein when the switch section is in the electrically connected state, an impedance between the matching section and the communication section is equal to or less than 10Ω (excluding 0),
wherein the antenna section generates a detected voltage in response to reception of a signal, and wherein:
when the detected voltage is not lower than a first threshold and is not higher than a second threshold that is higher than the first threshold, the switch control section sets the switch section to the electrically connected state,
when the detected voltage is higher than the second threshold, the switch control section sets the switch section to the electrically disconnected state, and
when the detected voltage is lower than the first threshold, the switch control section sets the switch section to the electrically disconnected state under a condition that the communication section is not required to carry out communication via the antenna section.

2. A communication device comprising:
an antenna section;
a switch section capable of taking an electrically connected state and an electrically disconnected state;
a matching section including an impedance matching circuit and connected between the antenna section and the switch section, the matching section matching a first impedance and a second impedance with each other when the switch section is in the electrically connected state, the first impedance being an impedance seen from the matching section toward the antenna section, and the second impedance being another impedance seen from the matching section toward the switch section;
a communication section connected to the switch section; and
a switch control section which controls the switch section to set the switch section to the electrically connected state when the communication section is required to carry out communication via the antenna section and which controls the switch section to set the switch section to the electrically disconnected state when the communication section is required to be protected against overvoltage,
wherein the switch control section is included in a semiconductor integrated circuit, and the switch section is another semiconductor circuit which is provided outside the semiconductor integrated circuit,
wherein the second impedance is lower than the first impedance,
wherein the antenna section generates a detected voltage in response to reception of a signal, and
wherein:
when the detected voltage is not lower than a first threshold and is not higher than a second threshold that is higher than the first threshold, the switch control section sets the switch section to the electrically connected state,
when the detected voltage is higher than the second threshold, the switch control section sets the switch section to the electrically disconnected state, and
when the detected voltage is lower than the first threshold, the switch control section sets the switch section to the electrically disconnected state under a condition that the communication section is not required to carry out communication via the antenna section.

3. A communication device comprising:
an antenna section;
a switch section capable of taking an electrically connected state and an electrically disconnected state;
a matching section including an impedance matching circuit and connected between the antenna section and the switch section, the matching section matching a first impedance and a second impedance with each other when the switch section is in the electrically connected state, the first impedance being an impedance seen from the matching section toward the antenna section, and the second impedance being another impedance seen from the matching section toward the switch section;

a communication section connected to the switch section; and a switch control section which controls the switch section to set the switch section to the electrically connected state when the communication section is required to carry out communication via the antenna section and which controls the switch section to set the switch section to the electrically disconnected state when the communication section is required to be protected against overvoltage, wherein the switch control section is included in a semiconductor integrated circuit, and the switch section is another semiconductor circuit which is provided outside the semiconductor integrated circuit, and wherein when the switch section is in the electrically disconnected state, an impedance between the matching section and the communication section is equal to or more than 400Ω.

4. A communication device comprising:

an antenna section;

a switch section capable of taking an electrically connected state and an electrically disconnected state;

a matching section including an impedance matching circuit and connected between the antenna section and the switch section, the matching section matching a first impedance and a second impedance with each other when the switch section is in the electrically connected state, the first impedance being an impedance seen from the matching section toward the antenna section, and the second impedance being another impedance seen from the matching section toward the switch section;

a communication section connected to the switch section; and a switch control section which controls the switch section to set the switch section to the electrically connected state when the communication section is required to carry out communication via the antenna section and which controls the switch section to set the switch section to the electrically disconnected state when the communication section is required to be protected against overvoltage, wherein the switch control section is included in a semiconductor integrated circuit, and the switch section is another semiconductor circuit which is provided outside the semiconductor integrated circuit, wherein the communication device further comprises a high voltage output section, wherein:
the switch control section generates a control signal to supply the control signal to the high voltage output section, and
in response to the control signal, the high voltage output section generates a high voltage control signal for controlling the switch section to supply the high voltage control signal to the switch section, wherein the antenna section generates a detected voltage in response to reception of a signal, and wherein:
when the detected voltage is not lower than a first threshold and is not higher than a second threshold that is higher than the first threshold, the switch control section sets the switch section to the electrically connected state,
when the detected voltage is higher than the second threshold, the switch control section sets the switch section to the electrically disconnected state, and
when the detected voltage is lower than the first threshold, the switch control section sets the switch section to the electrically disconnected state under a condition that the communication section is not required to carry out communication via the antenna section.

5. The communication device as recited in claim 4, wherein the high voltage output section includes a booster circuit.

6. A communication device comprising:

an antenna section;

a switch section capable of taking an electrically connected state and an electrically disconnected state;

a matching section including an impedance matching circuit and connected between the antenna section and the switch section, the matching section matching a first impedance and a second impedance with each other when the switch section is in the electrically connected state, the first impedance being an impedance seen from the matching section toward the antenna section, and the second impedance being another impedance seen from the matching section toward the switch section;

a communication section connected to the switch section; and a switch control section which controls the switch section to set the switch section to the electrically connected state when the communication section is required to carry out communication via the antenna section and which controls the switch section to set the switch section to the electrically disconnected state when the communication section is required to be protected against overvoltage, wherein the switch control section is included in a semiconductor integrated circuit, and the switch section is another semiconductor circuit which is provided outside the semiconductor integrated circuit, wherein the antenna section generates a detected voltage in response to reception of a signal, and wherein:
when the detected voltage is not lower than a first threshold and is not higher than a second threshold that is higher than the first threshold, the switch control section sets the switch section to the electrically connected state,
when the detected voltage is higher than the second threshold, the switch control section sets the switch section to the electrically disconnected state, and
when the detected voltage is lower than the first threshold, the switch control section sets the switch section to the electrically disconnected state under a condition that the communication section is not required to carry out communication via the antenna section.

* * * * *